United States Patent [19]
Wilkinson

[11] Patent Number: 5,263,565
[45] Date of Patent: Nov. 23, 1993

[54] COMBINATION PARKING METER AND ELECTRIC ENERGY DISPENSING APPARATUS AND METHOD

[76] Inventor: Rudolph P. Wilkinson, 1021 Osage, Ardmore, Okla. 73401

[21] Appl. No.: 980,509

[22] Filed: Nov. 23, 1992

[51] Int. Cl.$^5$ .............................................. G07F 17/24
[52] U.S. Cl. .................................... 194/216; 194/217; 194/904; 320/2
[58] Field of Search ............... 194/215, 216, 217, 904; 320/2, 30, 44

[56] References Cited

U.S. PATENT DOCUMENTS

| | | | |
|---|---|---|---|
| 735,505 | 8/1903 | Haskins | 194/311 |
| 3,105,929 | 10/1963 | Blue | 320/2 |
| 3,213,994 | 10/1965 | Hohler | 194/241 |
| 3,273,038 | 9/1966 | Miller | 320/2 |
| 3,529,229 | 9/1970 | Kennedy | 320/2 |
| 3,904,947 | 9/1975 | Crews | 320/2 |
| 4,052,655 | 10/1977 | Vizza | 320/2 |
| 4,158,802 | 6/1979 | Rose, III | 320/2 |
| 4,184,580 | 1/1980 | Ellis, Jr. | 194/239 |
| 4,289,226 | 9/1981 | Wilkinson | 194/297 |
| 4,309,644 | 1/1982 | Reimers et al. | 320/2 |
| 4,383,210 | 5/1983 | Wilkinson | 320/2 |
| 4,532,418 | 7/1985 | Meese et al. | 235/381 |
| 4,667,141 | 5/1987 | Steele | 320/2 |
| 5,049,802 | 9/1991 | Mintus et al. | |

FOREIGN PATENT DOCUMENTS

| | | | |
|---|---|---|---|
| 2501932 | 9/1982 | France | 320/2 |
| 1192036 | 11/1985 | U.S.S.R. | 320/2 |
| 2158308A | 11/1985 | United Kingdom | 191/904 X |

*Primary Examiner*—F. J. Bartuska
*Assistant Examiner*—Scott L. Lowe
*Attorney, Agent, or Firm*—Dougherty, Hessin, Beavers & Gilbert

[57] ABSTRACT

A combined parking meter and electric energy dispensing apparatus and method can automatically provide, in response to receiving a payment, either parking time or electric energy. When electric current is being consumed by a connected electric vehicle, the invention operates in an electric energy dispensing mode and allocates a received payment thereto. When no electric current flows from the apparatus, then the invention functions in a parking meter mode and allocates the received payment thereto.

10 Claims, 3 Drawing Sheets

COMBINATION PARKING METER AND ELECTRIC ENERGY DISPENSING APPARATUS AND METHOD

BACKGROUND OF THE INVENTION

This invention relates generally to a combined parking meter and electric energy dispensing apparatus and method. In a particular aspect, such apparatus and method self-detects whether a particular payment is to be applied as parking time or electric power consumption.

Parking meters have been known and used for many years as a means of selling parking time and collecting the revenue derived therefrom. Electric energy dispensing apparatus for recharging electric storage devices in vehicles have also been disclosed. There have also been disclosures of combined parking meters and electric energy dispensing apparatus.

The correct placement and mix of parking meters and electric energy dispensing devices is essential for the development of an efficient infrastructure necessary to support widespread use of electric vehicles. With separate devices for the sale of electric energy and for the sale of parking time, however, it is difficult to anticipate the correct and most advantageous placement of the proper meters to serve an ever changing market.

This difficulty can be avoided by providing an apparatus that is capable of functioning as either a parking meter or as an electric energy dispensing device. Although such has been generally disclosed, there is the further need for such an apparatus to be able to self-detect when electric power is being sold and operate itself in an electric energy dispensing mode and, conversely, self-detect when no power is being consumed and operate itself in a parking meter mode.

SUMMARY OF THE INVENTION

The present invention overcomes the above-noted and other shortcomings of the prior art and meets the aforementioned needs by providing a novel and improved combined parking meter and electric energy dispensing apparatus and method. When electric current is being consumed by a connected electric vehicle, the invention operates in an electric energy dispensing mode and allocates a received payment thereto. When no electric current flows from the invention, then the invention functions in a parking meter mode and allocates the received payment thereto.

The present invention provides a combined parking meter and electric energy dispensing apparatus, comprising: means for receiving a payment; means for conducting electric current from a primary electric power source to an electric energy storage device; means for sensing when electric current is conducted through the means for conducting to the electric energy storage device; and means for allocating a received payment either as an electric energy dispensing fee or as a parking time fee in response to whether or not the means for sensing senses electric current through the means for conducting. The apparatus further preferably comprises a housing having all the means disposed therein, which housing is disposed at a parking space for an electric motorized vehicle.

The present invention also provides a method of automatically providing either parking time or electric power for an electric vehicle at a public parking space, comprising: receiving at the public parking space a payment to be allocated automatically either as a fee for parking time or as a fee for electric power for the vehicle; connecting at the public parking space a primary electric power source to an electric conductor adapted to be connected to an electric energy storage device in the vehicle; sensing at the public parking space whether electric current is conducted through the electric conductor; and allocating at the public parking space a received payment either as an electric energy dispensing fee or as a parking time fee in response to whether or not electric current is sensed.

Therefore, from the foregoing, it is a general object of the present invention to provide a novel and improved combined parking meter and electric energy dispensing apparatus and method. Other and further objects, features and advantages of the present invention will be readily apparent to those skilled in the art when the following description of the preferred embodiment is read in conjunction with the accompanying drawings.

DETAILED DESCRIPTION OF PREFERRED EMBODIMENT

Figure 1:
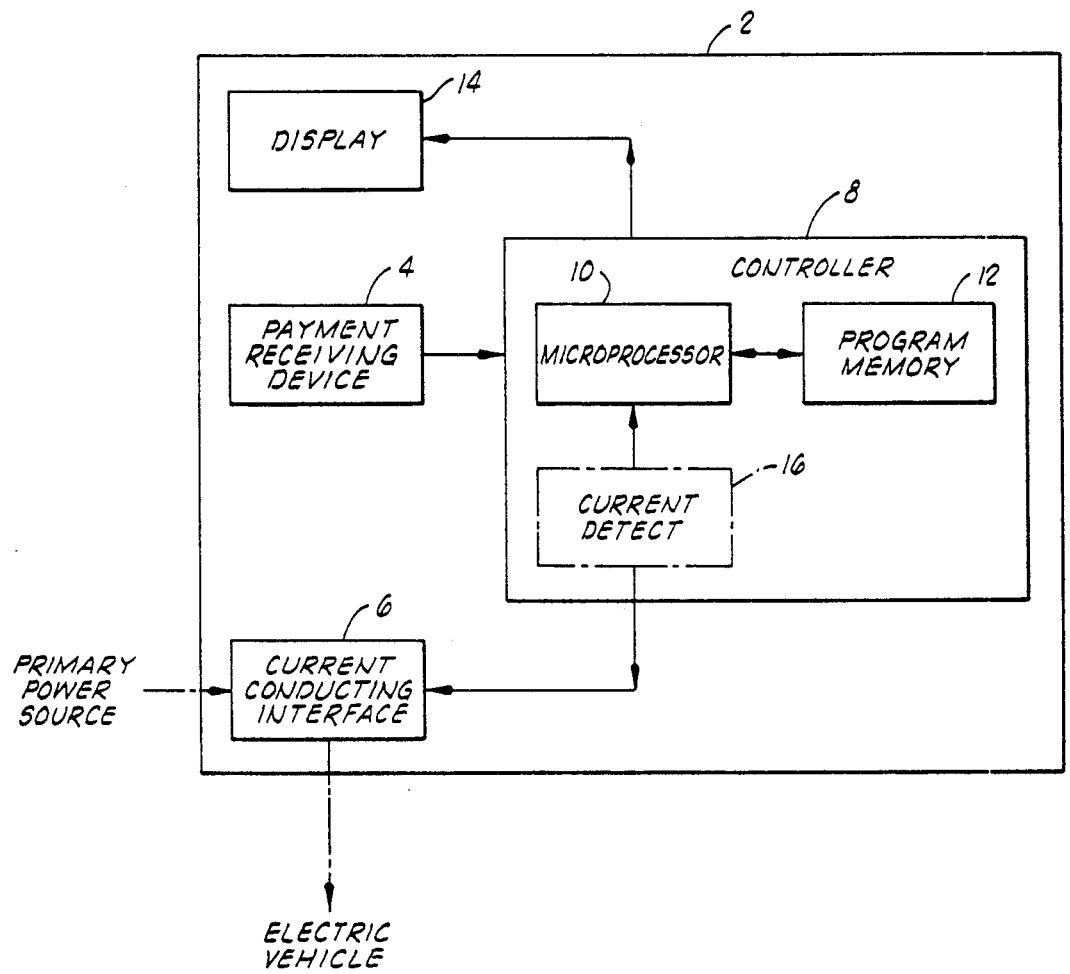
FIG. 1 is a block diagram of the apparatus of the present invention.
Figure 2A:
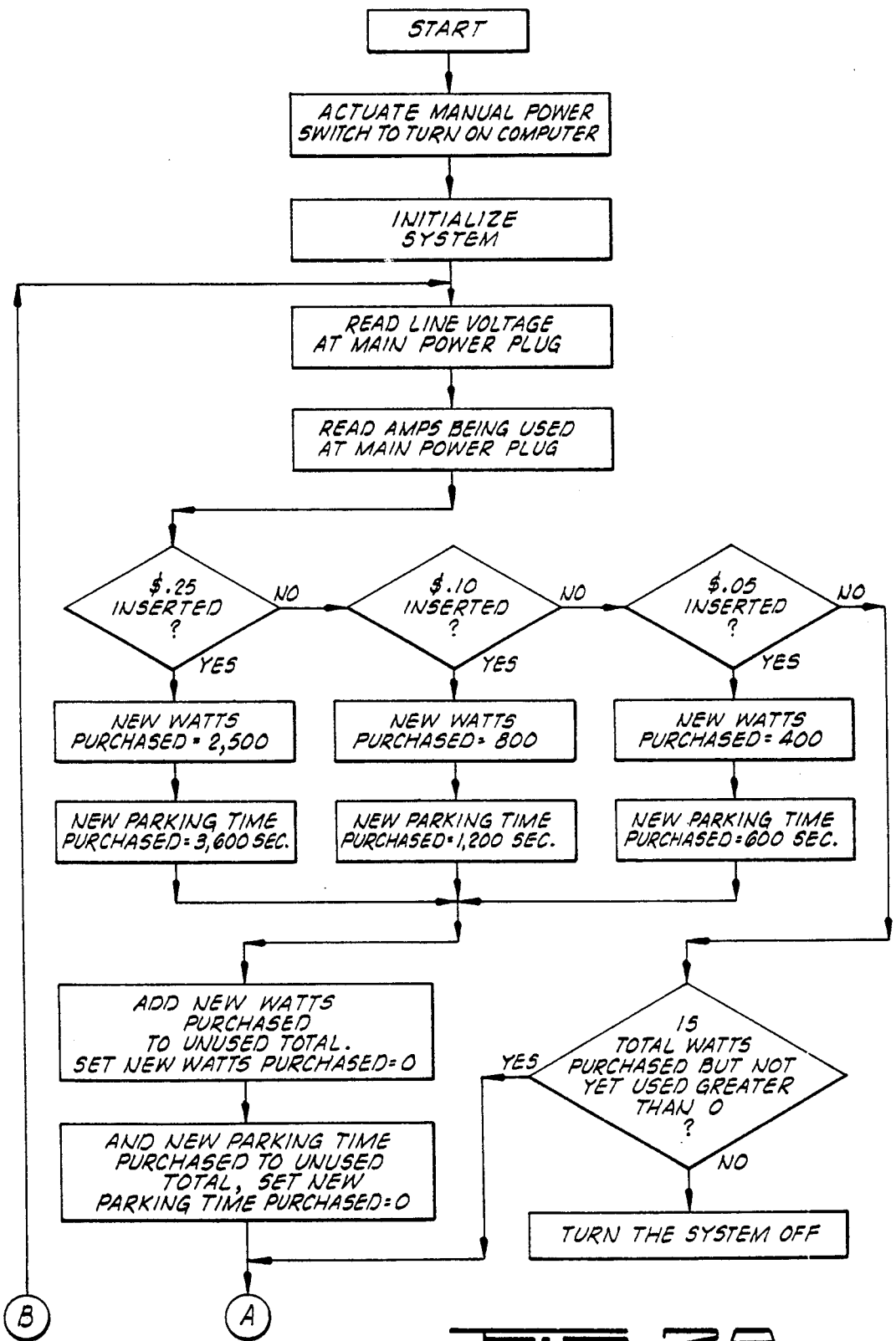
FIGS. 2A and 2B are a flow chart of a program for the apparatus and method of the present invention.
Figure 2B:
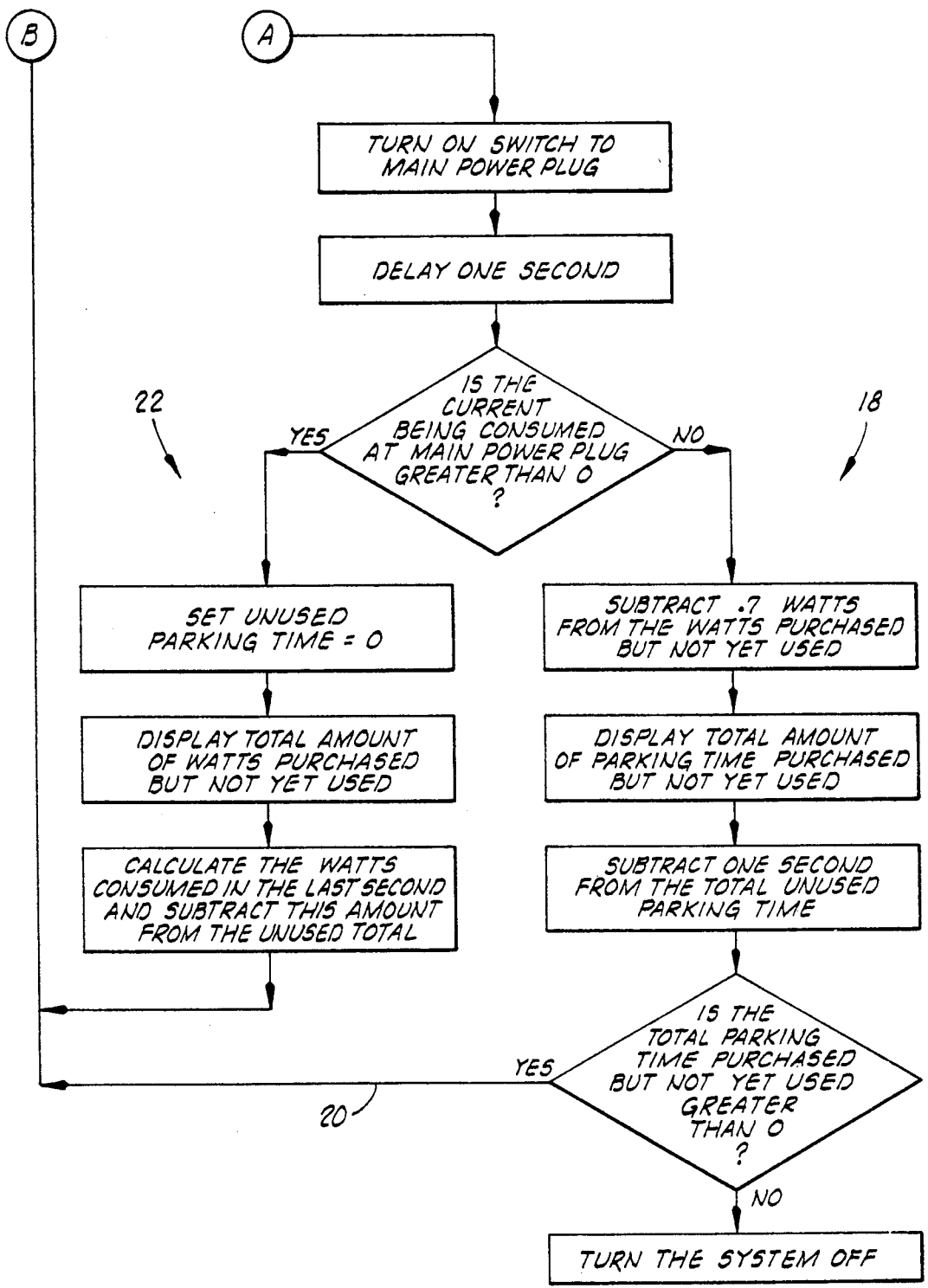

The preferred embodiment combined parking meter and electric energy dispensing apparatus of the present invention is generally depicted in FIG. 1; however, the preferred embodiment utilizes previously disclosed or otherwise conventional components except for their operative association or programming in accordance with the flow chart of FIGS. 2A and 2B. Particular implementations can take various forms. See, for example, U.S. Pat. No. 4,383,210 to Wilkinson; U.S. Pat. No. 4,289,226 to Wilkinson; U.S. Pat. No. 4,532,418 to Meese et al.; and UK Patent Application Publication GB 2158308A, all of which are incorporated herein by reference.

Referring to FIG. 1, the preferred embodiment apparatus is contained in a housing 2. The housing 2 can include the entire external weatherproof support structure (e.g., a pole and casing at the top of the pole) that is needed at a public parking space for a vehicle. The present invention is particularly adapted for use with an electrically powered or motorized vehicle; however, it can be used as a parking meter for any type of vehicle, and it can provide electric energy to any suitable electric device.

Disposed within, but accessible from outside the housing 2 is means 4 for receiving a payment. The payment receiving means 4 allows a user of the present invention to make a specific payment which is at the time of receipt indeterminate to the apparatus as to whether the payment is for parking time or for electric power. The payment receiving means 4 can include a coin or bill receiving mechanism or a credit card receiving mechanism, for example.

Also disposed within, but accessible from outside the housing 2 is means 6 for conducting electric current from a primary electric power source (e.g., a public electric utility power network, with suitable transformation and rectification if needed) to a connected electric device. The means 6 provides a switchable current conducting interface such as a conductor embodied as an electric receptacle or an electric cord to which the electric device can be attached to and to which the primary power source is switchably connectable such as through a relay controlled by a controller 8 of the present invention. The current conducting interface 6 can also or alternatively use magnetic induction to transfer energy to the connected device. An example of an electric device that can be energized by the present invention is an electric energy storage device such as a battery in an electric car.

The controller 8 includes in the preferred embodiment a microprocessor 1? and a program storage memory 12 containing a program for performing the steps represented in FIGS. 2A and 2B. The controller 8 includes suitable conventional interface components through which the microprocessor 10 can receive and send signals in known manner, such as with the payment receiving device 4 and a display 14 through which parking time and electric power information can be communicated to a user of the present invention. Furthermore, implemented by the program-operated microprocessor and (if needed) a suitable current detector circuit 16 is means for sensing when electric current is conducted through the current conducting interface 6 to a connected electric device.

The foregoing are preferably implemented in accordance with my prior disclosure in my U.S. Pat. No. 4,383,210 which has been incorporated herein by reference; however, the microprocessor 10 and memory 12 of the present invention are modified by programming depicted in FIGS. 2A and 2B to implement the following features of the present invention.

These features include means for allocating a received payment either as an electric energy dispensing fee or as a parking time fee in response to whether or not the means for sensing senses electric current through the current conducting means 6. The computer-implemented means for allocating includes: means for converting the amount of the payment to both an equivalent parking time amount and an equivalent electric power amount; means, responsive to the means for converting, for defining both an unused total parking time amount and an unused total electric power amount; and means for decreasing the unused total parking time amount by an actual elapsed time amount in response to the means for sensing not sensing electric current through the conductor means 6 and for decreasing the unused total electric power amount by an actual consumed electric power amount in response to the means for sensing sensing electric current through the conductor means 6. In the preferred embodiment, the means for decreasing also decreases the unused total electric power amount by a predetermined amount in response to the means for sensing not sensing electric current through the conductor means 6, and the means for decreasing also decreases the unused total parking amount to zero in response to the means for sensing sensing electric current through the conductor means 6. These features will be more fully described with the method of the present invention and with reference to FIGS. 2A and 2B.

At the start of the process depicted in FIGS. 2A and 2B, a manual power switch on the housing 2 is actuated to turn on the controller 8 (i.e., the internal circuits are connected to a power supply such as provided directly or indirectly from the primary power source). The system automatically initializes itself. The controller 8 then reads the line voltage at the main power plug embodied at the current conducting interface 6. The current flowing through the interface 6 is also determined.

Next, the controller 8 determines whether a payment has been made. In the illustrated flow chart, payment can be made by one of the three indicated coins being inserted into and received by a suitable coin receiving mechanism. When such a payment is received at the public parking space, it is to be allocated automatically either as a fee for parking time or as a fee for electric power. At the time of receiving the payment, however, it is indeterminate as to whether the payment is for parking time or for electric power.

If payment has been received, the controller 8 converts the amount of payment to both an equivalent electric power amount ("new watts purchased" in FIG. 2A.) and an equivalent parking time amount ("new parking time purchased" in FIG. 2A). Whatever the equivalent purchased amounts are, they are added to respective unused totals maintained by the controller 8. Once the unused total electric power amount and the unused total parking time amount have been updated, the registers for the newly purchased amounts are zeroed to await further payment.

Once the totals have been updated, the controller 8 activates the current conducting interface 6, such as by closing a relay, to conduct electric current from the primary power source to any connected electric device, such as a battery in an electric vehicle parked in the parking space where the particular apparatus of the present invention is located. After a delay, the controller 8 determines whether current is being consumed through the current conducting interface 6.

If the controller 8 senses that no current is being consumed, it automatically enters the parking meter mode which includes the steps generally indicated in FIG. 2B by the referenced numeral 18. These steps include subtracting a predetermined amount of power from the unused total electric power amount, displaying through the display 14 the total amount of parking time purchased but not yet used, and decreasing the unused total parking time amount by the actual elapsed time amount. The controller 8 then determines if the total parking time purchased but not yet used is greater than zero. If it is not, the system automatically turns itself off. If the total is greater than zero, various steps are repeated as indicated by the "yes" flow chart return line 20 in FIGS. 2B and 2A.

If the controller 8 determines that current is being consumed through the interface 6, then it enters the electric energy dispensing mode including steps identified by the reference numeral 22 in FIG. 2B. In this mode, the controller 8 decreases the unused total parking amount to zero, displays through the display 14 the total amount of power purchased but not yet used, and decreases the unused total electric power amount by the actual consumed electric power amount that it has determined. The various steps are then repeated as indicated by return via flow chart return line 20.

As previously explained, one step of the parking meter mode 18 is subtracting a predetermined amount of power from the unused total electric power amount. This is done to prevent a "double-dip" from occurring. That is, this prevents money used for parking time from also being used to purchase electric power. This effects the allocation of money to parking time in this mode. During the time an entire purchase is being used, however, a switch from parking time to power consumption can be made with regard to the unused portion of the payment. That is, since the unused total electric power amount is only incrementally decreased along with incremental decreases of the parking time, there can remain an unused total electric power amount which can be consumed if the electric vehicle is plugged into the current conducting interface 6 before all the payment has been allocated to parking time. The reverse is not available, however, in the illustrated embodiment because once electric charging occurs via electric energy dispensing mode 22, the unused total parking time amount is immediately decreased to zero as mentioned above. Thus, once energy dispensing commences, the full payment is allocated solely to it.

By the foregoing, the present invention allocates at the parking space whether a received payment is either an electric energy dispensing fee or a parking time fee dependent on whether or not electric current is sensed.

These steps are preferably performed in response to operating a programmed computer in the controller 8 as described.

In the event that no payment is received upon initial actuation of the present invention or during a return operation via line 20, the flow chart of FIG. 2A shows that then a determination is made by the controller 8 as to whether the unused total electric power amount is greater than zero. If it is not, the system is turned off. If it is greater than zero, the method continues by turning on the energizing power via appropriately switching the current conducting interface 6 as previously described. The succeeding steps are then performed as previously described.

The foregoing method can be implemented using known devices suitably programmed using known programming techniques given the foregoing description and the accompanying drawings.

Thus, the present invention is well adapted to carry out the objects and attain the ends and advantages mentioned above as well as those inherent therein. While a preferred embodiment of the invention has been described for the purpose of this disclosure, changes in the construction and arrangement of parts and the performance of steps can be made by those skilled in the art, which changes are encompassed within the spirit of this invention as defined by the appended claims.

What is claimed is:

1. Combined parking meter and electric energy dispensing apparatus, comprising:
   means for receiving a payment;
   means for conducting electric current from a primary electric power source to an electric energy storage device;
   means for sensing when electric current is conducted through said means for conducting to the electric energy storage device; and
   means for allocating a received payment as an electric energy dispensing fee in response to said means for sensing sensing electric current through said means for conducting, and as a parking time fee in response to said means for sensing not sensing electric current through said means for conducting.

2. An apparatus as defined in claim further comprising a housing having all said means disposed therein, said housing disposed at a parking space for an electric motorized vehicle.

3. Combined parking meter and electric energy dispensing apparatus, comprising:
   conductor means for connecting to an electric energy storage device in a vehicle;
   means for receiving from a user of said apparatus a specific payment which is at the time of receipt indeterminate to said apparatus as to whether said payment is for parking time or for electric power;
   means for converting the amount of said payment to both an equivalent parking time amount and an equivalent electric power amount;
   means, responsive to said means for converting, for defining both an unused total parking time amount and an unused total electric power amount;
   means for sensing when electric current is conducted through said conductor means; and
   means for decreasing said unused total parking time amount by an actual elapsed time amount in response to said means for sensing not sensing electric current through said conductor means and for decreasing said unused total electric power amount by an actual consumed electric power amount in response to said means for sensing sensing electric current through said conductor means.

4. An apparatus as defined in claim 3, wherein said means for decreasing also decreases said unused total electric power amount by a predetermined amount in response to said means for sensing not sensing electric current through said conductor means and further wherein said means for decreasing also decreases said unused total parking amount to zero in response to said means for sensing sensing electric current through said conductor means.

5. An apparatus as defined in claim 4, further comprising a housing having all said means disposed therein, said housing disposed at a public parking space for the vehicle.

6. A method of automatically providing either parking time or electric power for an electric vehicle at a public parking space, comprising:
   receiving at the public parking space a payment to be allocated automatically either as a fee for parking time or as a fee for electric power for the vehicle;
   connecting at the public parking space a primary electric power source to an electric conductor adapted to be connected to an electric energy storage device in the vehicle;
   sensing at the public parking space whether electric current is conducted through the electric conductor;
   allocating at the public parking space a received payment as an electric energy dispensing fee in response to electric current being conducted through the electric conductor; and
   allocating at the public parking space a received payment as a parking time fee in response to electric current not being conducted through the electric conductor.

7. A method as defined in claim 6, wherein:
   at the time of receiving the payment, it is indeterminate as to whether the payment is for parking time or for electric power; and
   said allocating includes:
      converting the amount of the payment to both an equivalent parking time amount and an equivalent electric power amount;
      defining, in response to the equivalent parking time amount and the equivalent electric power amount, respectively, both an unused total parking time amount and an unused total electric power amount; and decreasing the unused total parking time amount by an actual elapsed time amount in response to not sensing electric current and decreasing the unused total electric power amount by an actual consumed electric power amount in response to sensing electric current.

8. A method as defined in claim 7, wherein said allocating further includes decreasing the unused total electric power amount by a predetermined amount in response to not sensing electric current and decreasing the unused total parking amount to zero in response to sensing electric current.

9. A method as defined in claim 8, further comprising performing said steps in response to operating a programmed computer disposed in a housing at the parking space.

10. A method as defined in claim 6, further comprising performing said steps in response to operating a programmed computer at the parking space.

* * * * *